US007187474B1

(12) United States Patent
Chen et al.

(10) Patent No.: US 7,187,474 B1
(45) Date of Patent: Mar. 6, 2007

(54) SYSTEM AND METHOD FOR HALFTONING USING A TIME-VARIABLE HALFTONE PATTERN

(75) Inventors: Kok S. Chen, Sunnyvale, CA (US); Gabriel G. Marcu, San Jose, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/344,826

(22) Filed: Jun. 25, 1999

(51) Int. Cl.
*H04N 1/405* (2006.01)

(52) U.S. Cl. ...................................... 358/3.2; 358/3.21

(58) Field of Classification Search ................. 358/1.9, 358/3.12–3.21
See application file for complete search history.

(56) References Cited

U.S. PATENT DOCUMENTS 3,937,878 A 2/1976 Judice ..................... 178/7.3 D
5,394,518 A 2/1995 Friedman et al. ........... 395/131
5,543,941 A * 8/1996 Parker et al. ............... 358/534
5,708,518 A 1/1998 Parker et al. ............... 358/534
6,072,451 A * 6/2000 Mano et al. .................. 345/89
2002/0080098 A1* 6/2002 Kim ............................ 345/60

FOREIGN PATENT DOCUMENTS

JP 08044313 A * 2/1996

* cited by examiner

*Primary Examiner*—Thomas D. Lee
*Assistant Examiner*—Stephen Brinich
(74) *Attorney, Agent, or Firm*—Nancy R. Simon

(57) ABSTRACT

The present invention overcomes the limitations of the prior art by providing a system and method for halftoning using time-variable halftone patterns. Successive frames that are presented to the output device are individually halftoned. The halftone pattern is changed from frame to frame. The different halftone patterns can be generated in real time, or they can be calculated prior to halftoning and stored in memory. Additionally, the halftone patterns can be generated using any conventional halftoning technique. The same halftoning technique can used to create each halftone pattern, or the halftoning techniques can be varied when creating halftone patterns. The halftoned frames are then viewed in a sequence in time. Because the halftone pattern is changing from frame to frame, the visibility of the pattern is reduced when compared with the patterns produced by prior art halftoning methods.

33 Claims, 9 Drawing Sheets

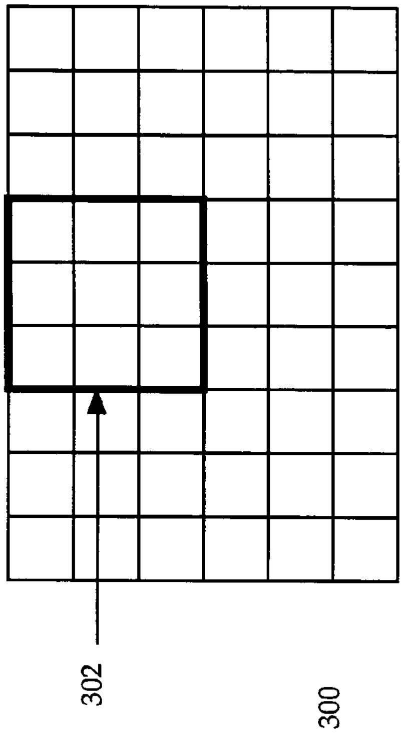
Figure 3b - Prior Art
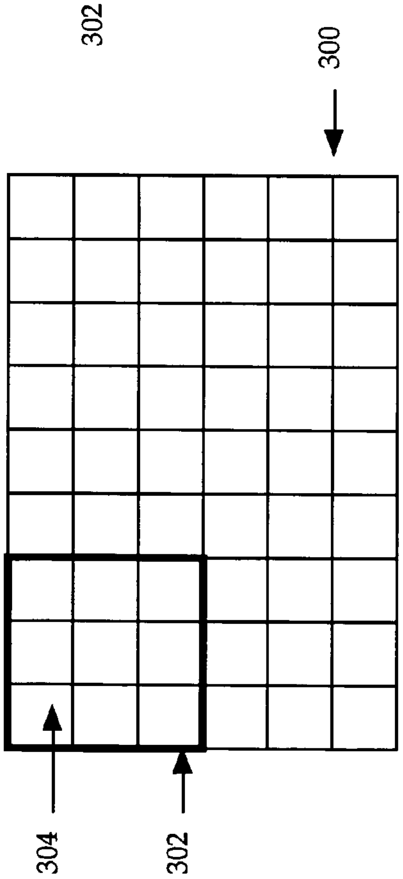
Figure 3a - Prior Art
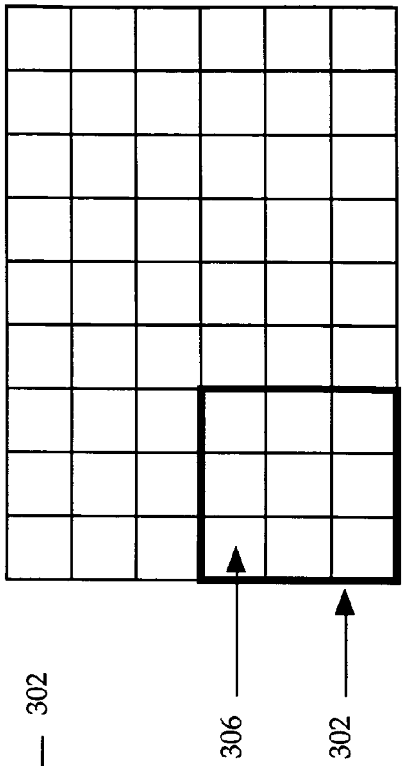
Figure 3d - Prior Art
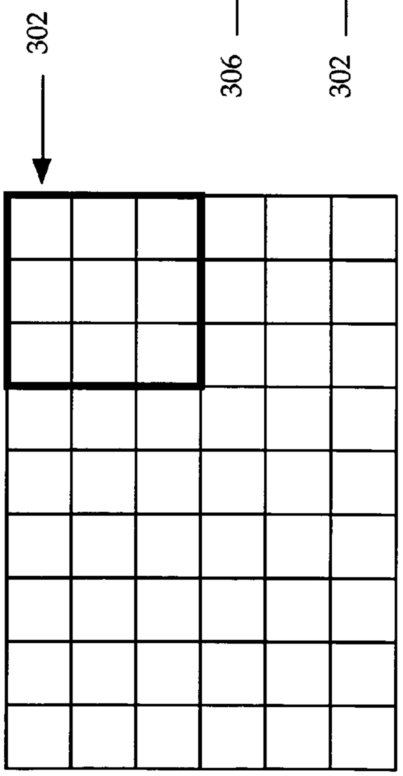
Figure 3c - Prior Art

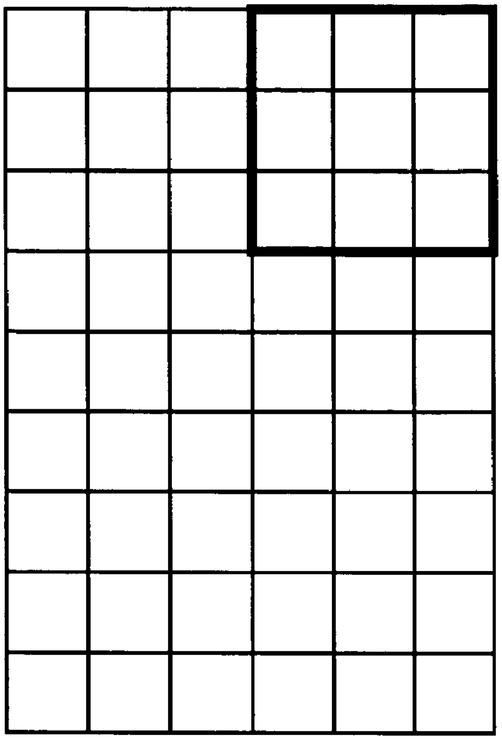
Figure 3f - Prior Art
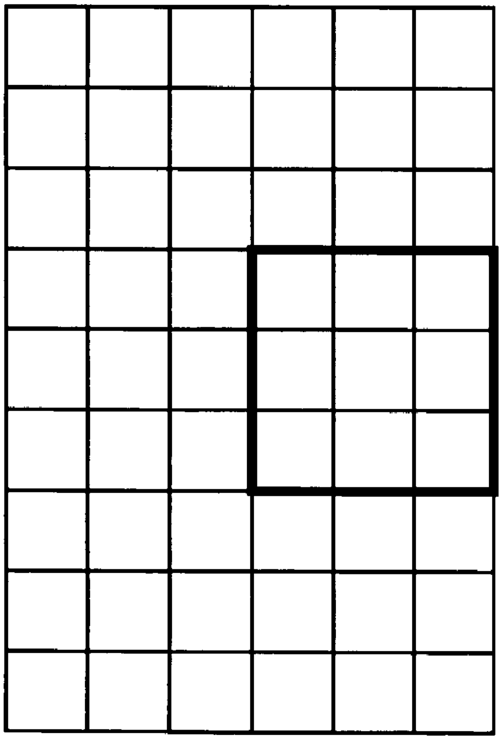
Figure 3e - Prior Art

SYSTEM AND METHOD FOR HALFTONING USING A TIME-VARIABLE HALFTONE PATTERN

BACKGROUND OF THE INVENTION

1. Field of the Invention

The present invention relates to the field of image reproduction, and more particularly, to halftoning. Still more particularly, the present invention relates to a system and method for halftoning using a time-variable halftone pattern.

2. Description of the Prior Art

Bi-level and multi-level devices have limited tonal range. Intermediate tones, such as varying shades of gray, must be represented by halftones. Halftoning is a process by which continuous-tone colors are approximated by a pattern of pixels that can achieve only a limited number of discrete colors. The most familiar case of this is the rendering of gray tones with black and white pixels, as in a newspaper photograph.

There are may conventional techniques for halftoning. Dithering, stochastic screens, and error diffusion are all different types of halftoning techniques. When a particular halftoning technique is used, the resulting image is comprised of halftone patterns. In other words, halftone patterns are what the halftoning techniques create.

Contemporary halftoning techniques have parameters specific to each technique. For example, dithering techniques include order and unordered dithering. Error diffusion is an example of unordered dithering. Ordered dithering is usually implemented using a threshold array. Furthermore, ordered dithering can be further sub-categorized into clustered or dispersed dot dithers.

With clustered dot dithering, the arrangement of the gray levels tends to result in the formation of clumps or clusters. With dispersed dot dithering, the successive gray threshold values in the array are spread or dispersed away from each other as much as possible. Stochastic screens are a class of dispersed dot dithering in which the appearance of the halftoned result is similar to that of an unordered dither. Stochastic screens are preferred over unordered dithering in that it has much better computational efficiencies (both in time and in memory usage).

When an image is halftoned, the parameter or parameters (i.e., ordered, threshold array) specific to the halftoning technique remains constant during the halftoning process. For example, the same array is used each time the image is halftoned.

For display devices, such as computer monitors and televisions, images are presented as frames that are refreshed or repeated many times a second. This refreshing or repeating of the image occurs regardless of whether the image itself is changing over time. So, for a picture displayed on a computer monitor, a movie played on television, or a movie played in a theater, each frame is refreshed or repeated many times a second.

However, as discussed earlier, the parameters in contemporary halftoning techniques remain constant while each frame is repeated. This can create artifacts in the image, in that the halftone patterns become visible to the human eye. This is especially true for animated images, because the halftone pattern remains fixed over time while the frames in the image move and change over time.

SUMMARY OF THE INVENTION

The present invention overcomes the limitations of the prior art by providing a system and method for halftoning using a time-variable halftone pattern. Successive frames that are presented to the output device are individually halftoned. The halftone pattern is changed from frame to frame. The different halftone patterns can be generated in real time, or they can be calculated prior to halftoning and stored in memory. Additionally, the halftone patterns can be generated using any conventional halftoning technique. The same halftoning technique can be used to create each halftone pattern, or the halftoning techniques can be varied when creating halftone patterns. The halftoned frames are then viewed in a sequence in time. Because the halftone pattern is changing from frame to frame, the visibility of the pattern is reduced when compared with the patterns produced by prior art halftoning methods.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIGS. 3*a*–3*f* illustrate an exemplary prior art method for halftoning;

DESCRIPTION OF THE PREFERRED EMBODIMENT

To facilitate an understanding of the present invention, it is described hereinafter in the context of a specific embodiment. In particular, reference is made to an implementation of the invention on a computer display where the image being displayed is halftoned using a halftone mask as the halftoning technique. It will be appreciated, however, that the practical applications of the invention are not limited to this particular embodiment. Rather, the invention can be employed in other types of output devices, such as televisions and movie players. Furthermore, the present invention is not limited to the use of halftone masks as the halftoning technique. Other halftoning techniques, such as dithering or error diffusion, can be used.

Figure 1:
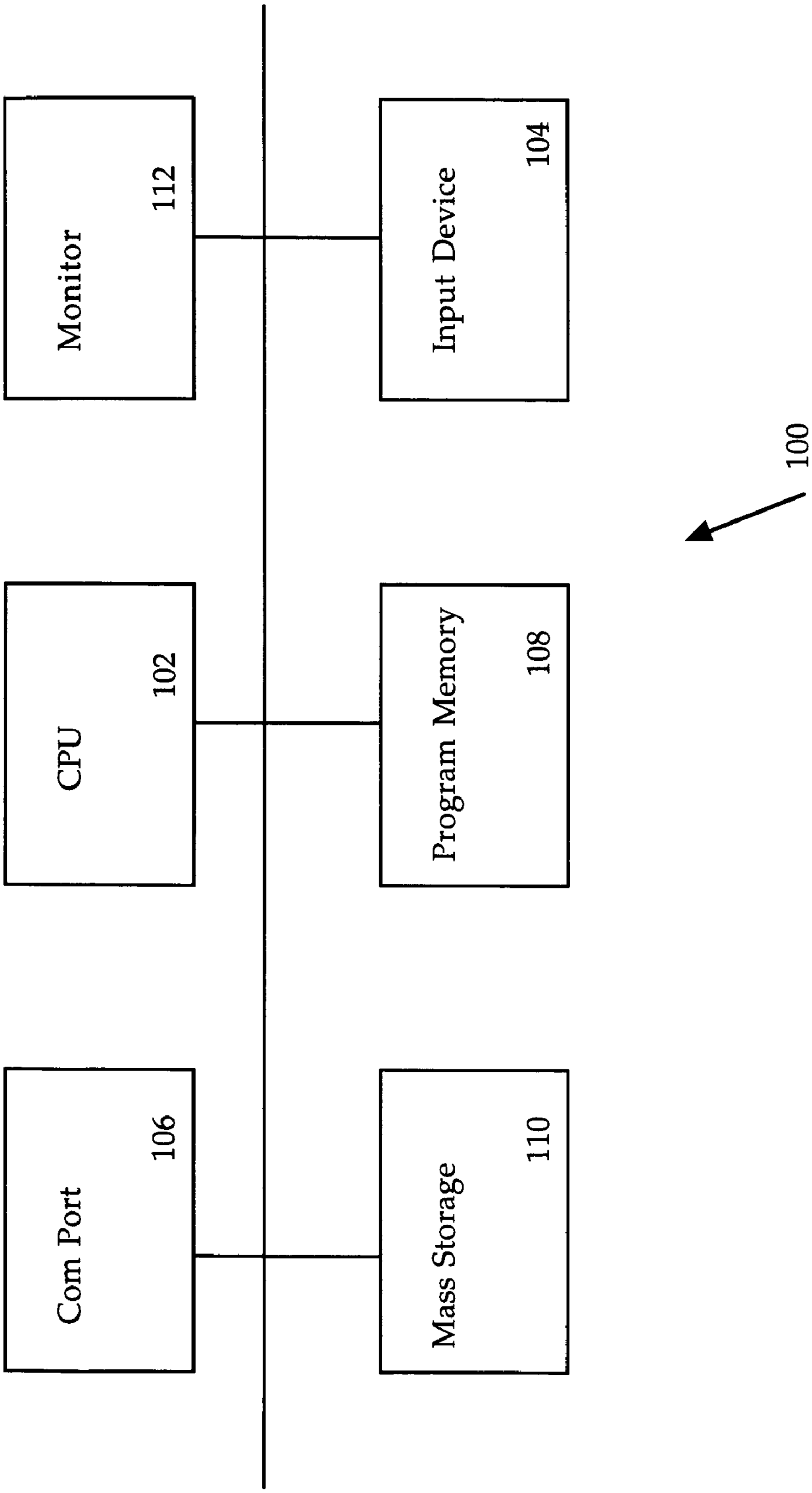
FIG. 1 is an exemplary block diagram of a general purpose computer system that can be used to implement the present invention.

With reference now to the figures and in particular with reference to FIG. 1, a general purpose computer system that can be used to implement the present invention is illustrated.

Computer system 100 includes a central processing unit (CPU) 102 that typically is comprised of a microprocessor, related logic circuitry, and related memory circuitry. Input device 104 provides input to CPU 102, with examples of input devices including a keyboard, mouse, or stylus. Communications port (Com. Port) 106 is used for interfacing with other processors and communication devices, such as modems and area networks. Program memory 108 contains operating instructions for directing the control of CPU 102. Mass storage 110 contains stored data that is utilized by CPU 102 in executing the program instructions from program memory 108. And finally, computer monitor 112 outputs data and information to a user.

Figure 2A:
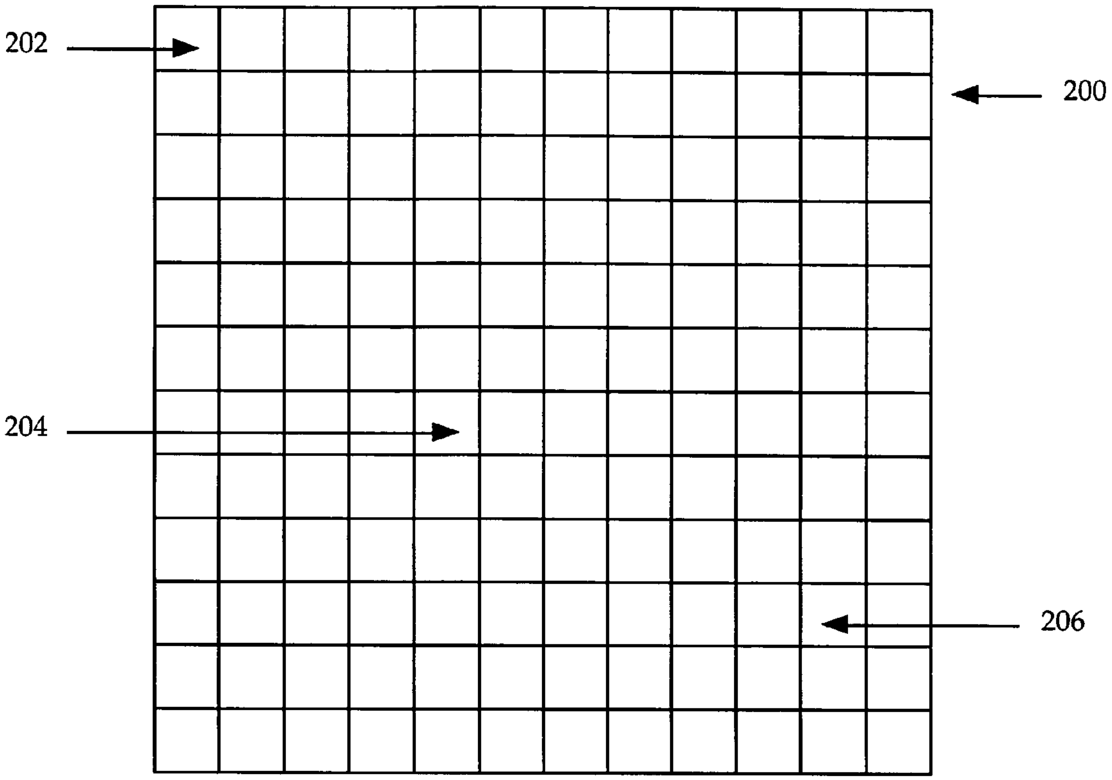
FIG. 2*a* illustrates an exemplary image comprised of pixels.

FIG. 2*a* illustrates an exemplary image comprised of pixels. Image 200 is shown as a 12×12 image comprised of 144 pixels. Pixels are usually arranged on an orthogonal grid, with the pixels placed at evenly spaced lattice points. Typically image 200 is associated with the (x,y) coordinate system, with the rows as the x coordinate and the columns as the y coordinate. Pixel 202 is usually considered the pixel in the (0,0) location. With pixel 202 at (0,0), pixel 204 is located at (6,4) and pixel 206 is positioned at (9,10) in the image.

Figure 2B:
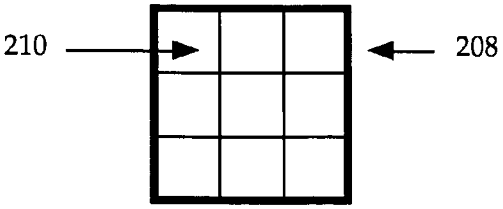
FIG. 2*b* depicts an exemplary halftone mask comprised of threshold values.

Referring to FIG. 2*b*, an exemplary halftone mask comprised of threshold values is shown. Mask 208 is illustrated as a 3×3 mask comprised of 9 threshold values. In order to determine whether a pixel in image 200 is "on" or "off", an imaging device checks a pixel's address (i.e. it's (x,y) location), determines the tonal value of the image at that address, and compares that tonal value with it's corresponding threshold value in the halftone mask. If the tonal value of the pixel exceeds the threshold value in the halftone mask, the pixel is turned "on" when the image is displayed on the computer monitor.

For example, in order to determine whether pixel 202 is "on" or "off", an imaging device checks the address of pixel 202, which in this example is (0,0), determines the tonal value at that address, and compares that tonal value with the threshold value 210 in halftone mask 208. If the tonal value of pixel 202 exceeds the threshold value 210, pixel 202 is turned "on" when the image is displayed.

FIGS. 3*a*–3*f* illustrate an exemplary prior art method for halftoning. Image 300 is shown as a 9×6 image, comprised of 54 pixels. Threshold array 302 is represented as a 3×3 array, and is comprised of threshold values. Pixel 304 in image 300 (FIG. 3*a*) is the pixel located at (0,0). When halftoning occurs, threshold array 302 is replicated and "tiled" (i.e., filled in a non-overlapping manner) over the entire image 300. FIGS. 3*a*–3*f* illustrate the process of halftoning by tiling threshold array 302 over image 300.

For a computer monitor, threshold array 302 is tiled over image 300 in a raster pattern. In other words, threshold array 302 is initially placed at the (0,0) location in image 300. It is then tiled along the first three rows until threshold array 302 reaches the end of the rows. This process is shown in FIGS. 3*a* through 3*c*. Once the end of the first three rows is reached, threshold array 302 is then moved to the start of the three rows. This would place the upper left-hand corner of threshold array at pixel 306. Again, threshold array 302 is tiled along the next three rows until threshold array 302 reaches the end of the rows. This process is shown in FIGS. 3*d* through 3*f*. Image 300 is now halftoned, because in this example, image 300 is a 9×6 image, so there are no more pixels left to halftone. Obviously, tiling threshold array 302 in this manner would continue if image 300 was larger.

In this prior art method of halftoning, threshold array 302 remains constant while the image is halftoned. For example, if the image is rendered on a display, the image is halftoned each time the image is drawn to the screen. In this situation, the halftone parameters do not change when the image is drawn and re-drawn to the screen because the same threshold array is used to halftone the images.

Figure 4:
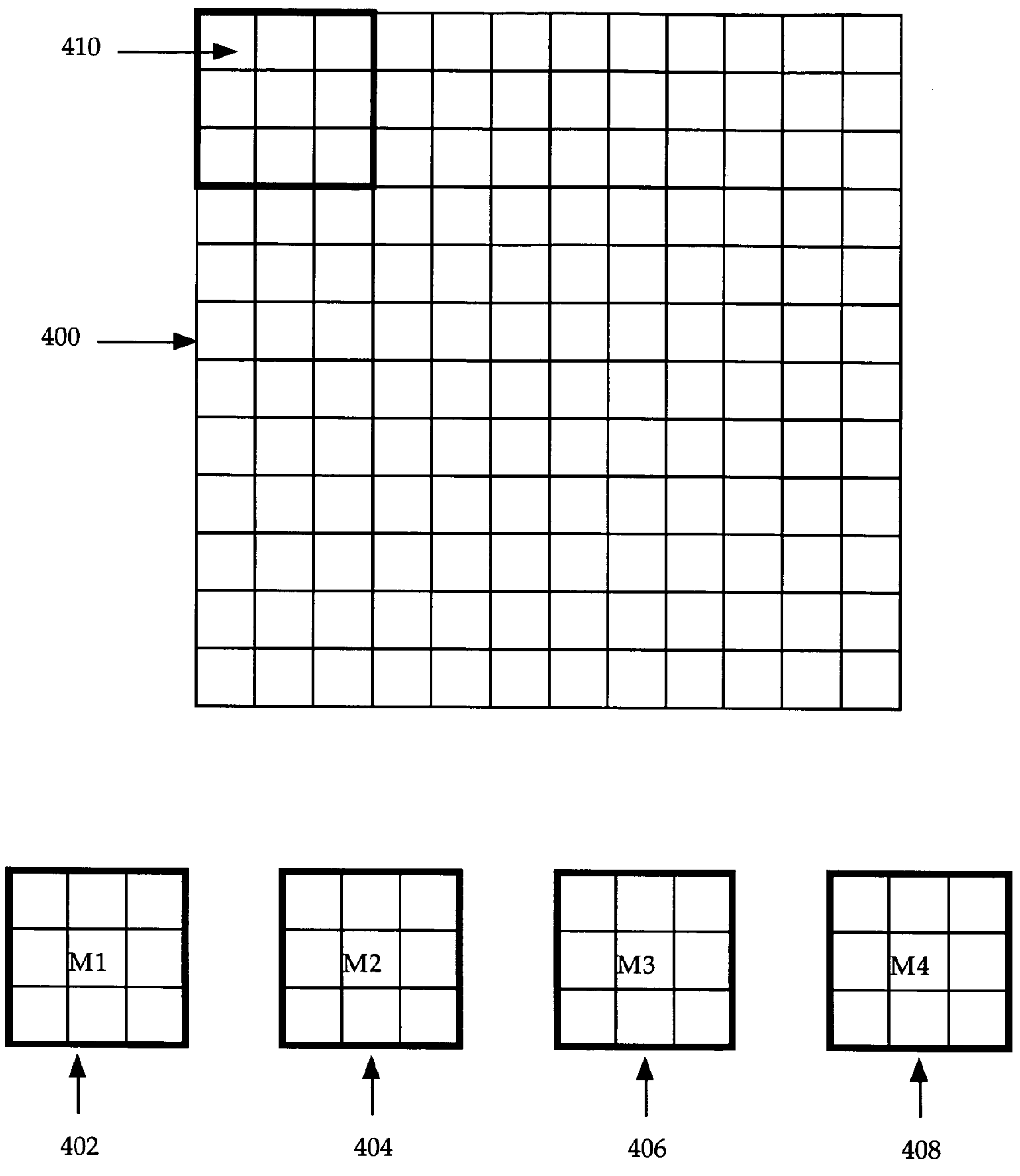
FIG. 4 depicts an exemplary method for halftoning using a time-variable halftone mask according to the present invention.

FIG. 4 depicts an exemplary method for halftoning using a time-variable halftone mask according to the present invention. Image 400 is to be halftoned using four separate and independent halftone masks 402, 404, 406, 408. Halftone masks 402, 404, 406, 408 were created independent of one another and are preferably stored in memory. When image 400 is to be halftoned, halftone mask 402 is used first to halftone image 400. Preferably, halftone mask 402 is placed at the initial pixel 410 and then tiled over the entire image. Halftone mask 404 is then selected and tiled over the image, followed by halftone mask 406. Finally, halftone mask 408 is selected and tiled over image 400. The halftoned images are then viewed in a continuous sequence in time. Because the halftone parameters change from one image to the next, the visibility of artifacts in the pattern is reduced compared with the patterns created by prior art methods.

This exemplary method is not however, limited to only four halftone masks. Any number of halftone masks can be used. Those skilled in the art will appreciate that the flicker period can be reduced by increasing the number of halftone masks. Furthermore, halftone masks 402, 404, 406, 408 do not have to be stored in memory. They can be calculated in real time.

FIGS. 5*a*–5*d* depict an alternative exemplary method for halftoning using a time-variable halftone mask according to the present invention. In this example, only one halftone mask is used to generate different halftoned frames, where the frames are combined to create the output image. Different (x,y) offsets are used to place the mask in the input image in order to generate a halftoned frame.

Figure 5B:
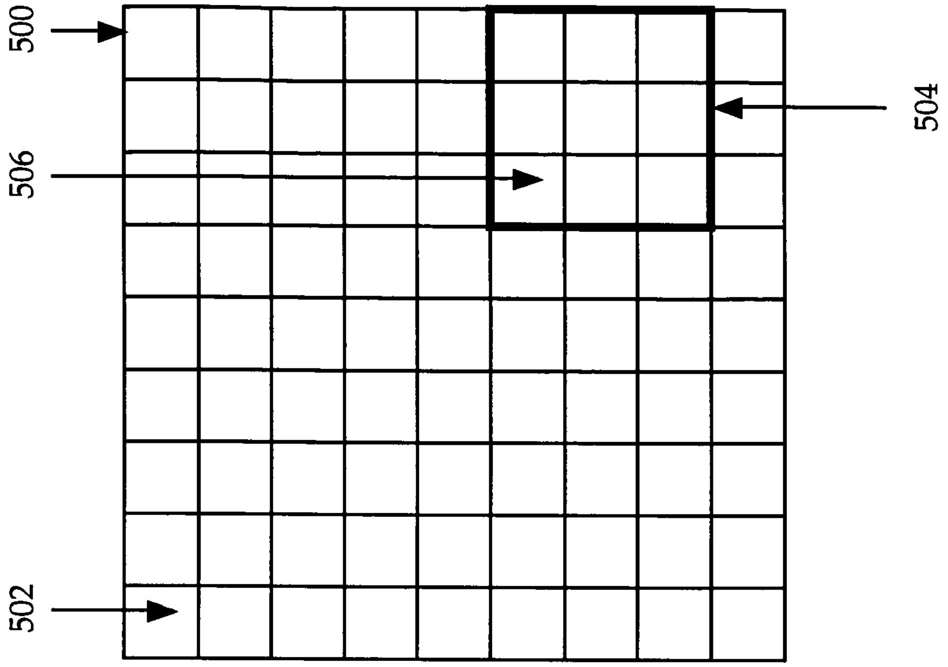
FIGS. 5*a*–5*d* illustrate an alternative exemplary method for halftoning using a time-variable halftone mask according to the present invention.
Figure 5A:
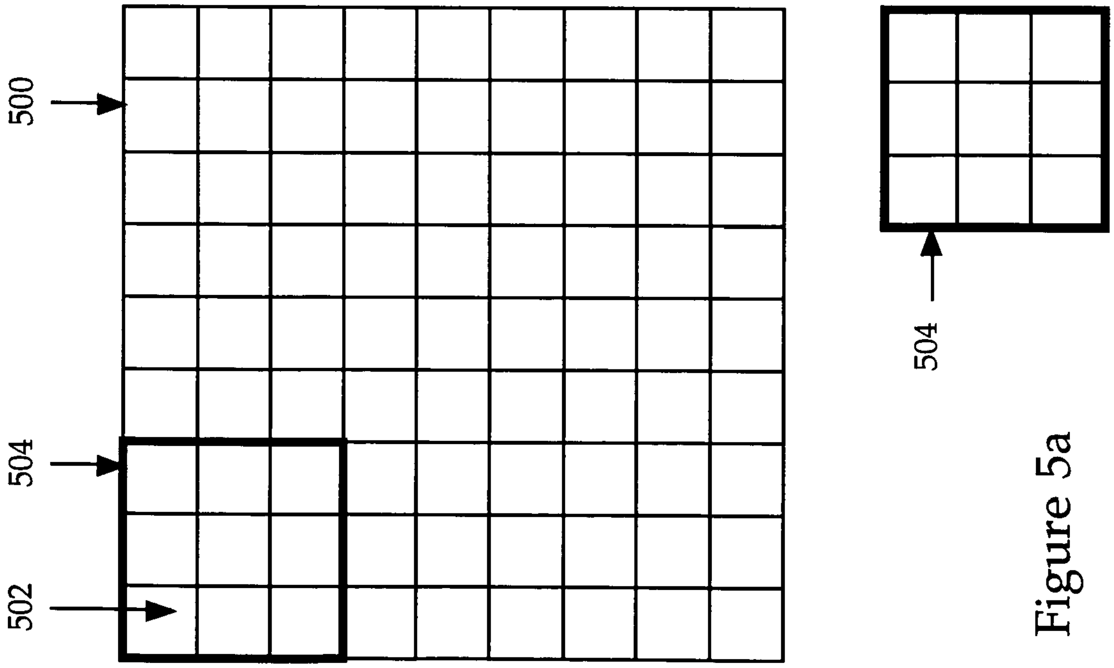
Figure 5D:
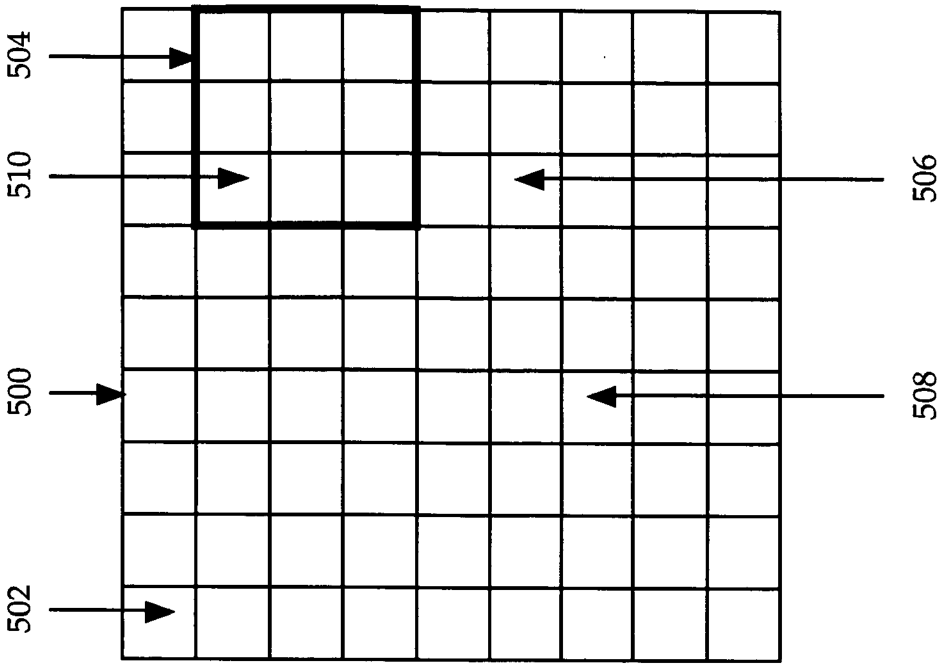

In FIG. 5*a*, image 500 is a 9×9 image, and is comprised of 81 pixels. Pixel 502 is located at the (0,0) position in image 500. Halftone mask 504 will be used to halftone image 500. In this example, halftone mask 504 is a 3×3 array, comprised of nine threshold values. Halftone mask 504 is placed at the initial location (0,0) in image 500, and is then used to halftone the image is tiling halftone mask 504 over the entire image. This creates the first halftoned frame. In FIG. 5*b* halftone mask 504 is offset to location (5,6) in the image. The second halftoned frame is created when image 500 is halftoned again.

Figure 5C:
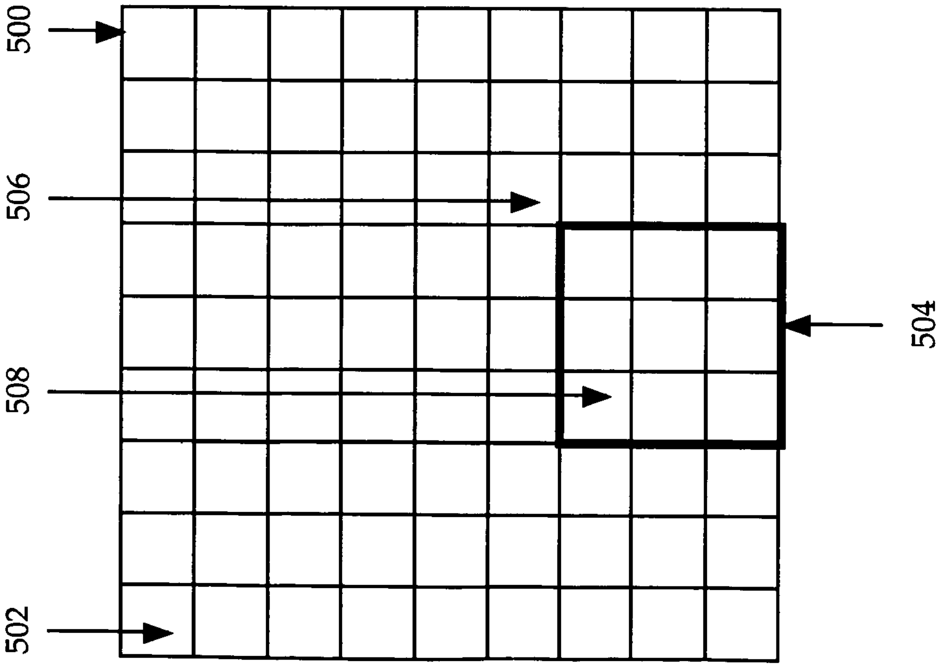

Halftone mask 504 is then offset again to location (6,3), represented in FIG. 5*c* by pixel 508. Image 500 is again halftoned, and a third frame is produced. Finally, in FIG. 5*d*, halftone mask 504 is offset to pixel 510, located at (1,6) and a fourth halftoned frame is created. The resulting halftoned frames are then displayed in a sequence, thereby creating the output image. This process of changing the offsets of halftone mask 504 within image 500 repeats until halftoning is complete.

With reference now to FIGS. 6*a*–6*i*, an exemplary sequence of halftoned frames of constant gray of 95% luminance, created by halftoning with a time-variable halftone mask according to the present invention are shown. A halftone mask comprised of 128×128 threshold values was used to create the 40×30 halftoned frames shown in FIGS. 6*a*–6*i*.

Figure 6A:
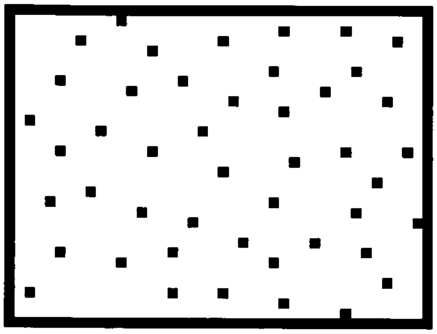
FIGS. 6*a*–6*i* depict an exemplary sequence of halftoned frames of constant gray of 95% luminance, created by halftoning with a time-variable halftone mask according to the present invention.
Figure 6B:
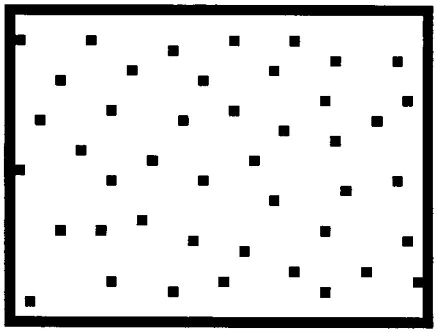
Figure 6C:
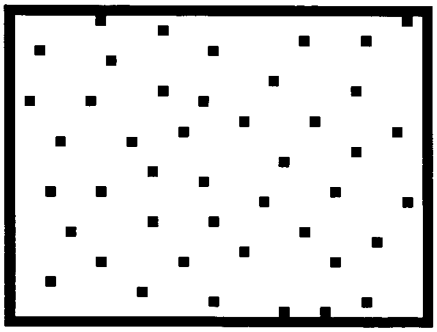
Figure 6D:
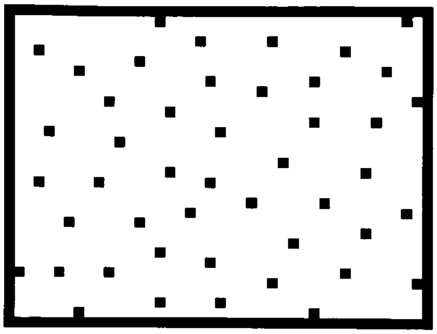
Figure 6E:
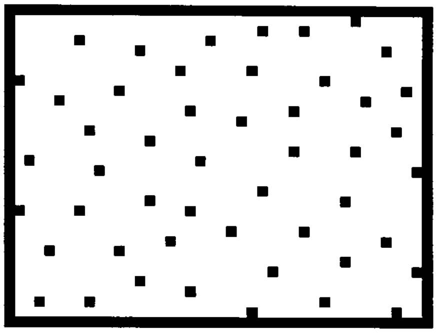
Figure 6F:
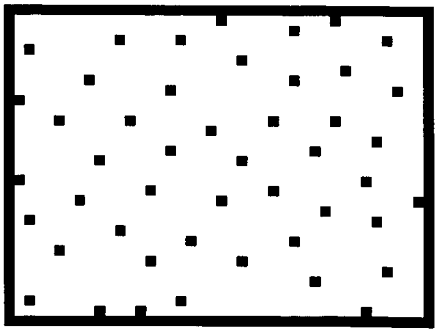
Figure 6G:
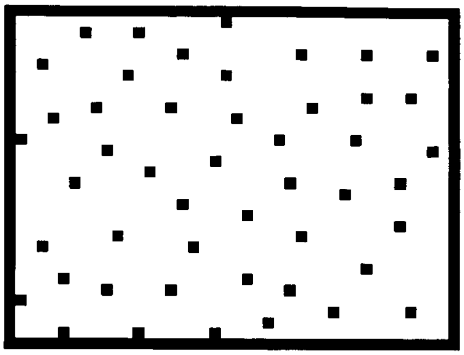
Figure 6H:
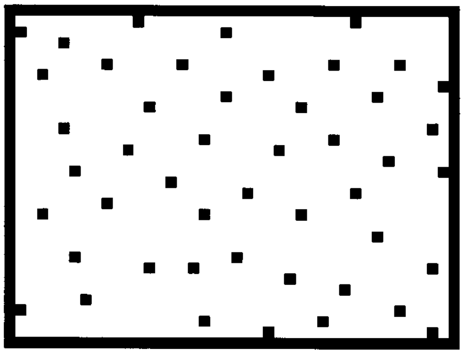
Figure 6I:
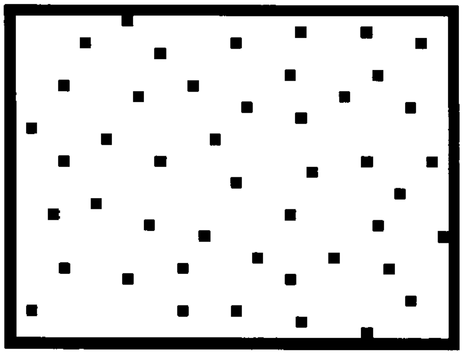

The halftoned frame shown in FIG. 6*a* was created by positioning the halftone mask at location (38,28) in the image and then halftoning the image. The halftone mask is offset to location (33,25) in the image and the image is halftoned a second time, resulting in the halftoned frame shown in FIG. 6*b*. A third halftoned frame illustrated in FIG. 6*c* is then generated by offsetting the halftone mask to location (11,17) in the image. Continuing with this process, the halftoned frames shown in FIGS. 6*d*, 6*e*, 6*f*, 6*g* and 6*h* are generated by offsetting the halftone mask to locations (10,9), (12,6), (29,17), (4,0), and (25,23), respectively.

In the embodiment represented in FIG. 6, the sequencing of halftoned frames then repeats itself. FIG. 6*i* was created by using the same offset that was used for FIG. 6*a*. As can be seen, the halftoned frame in FIG. 6*i* is the same as the halftoned frame in FIG. 6*a*. This offsetting of the halftone mask is repeated until the displayed output image is no longer needed.

The present invention, however, is not limited to offsetting the threshold mask, Different rotations, or transformations applied to the halftone mask can be used as an alternative to offsetting the halftone mask.

The image being halftoned by the methods described with reference to FIGS. 4–6 can be animated or static. If the image is animated, different halftone masks can be used on each frame, or a sequence of halftone masks can be used in a continuous loop. Those skilled in the art will appreciate that through the appropriate selection of differing halftone masks over time, the flicker normally associated with prior art halftoning techniques can be significantly reduced. A set of halftone masks can be selected so as to minimize the temporal correlation. In fact, the halftone masks can be chosen such that any spatial location, when viewed in time, would have minimal correlation.

The method used to obtain the halftoned frames, however, is not limited to thresholding by halftone masks. Any spatial halftoning technique, acting on an area larger than a pixel, can be used with the present invention by simply varying the halftoning parameters over time to create different halftone frames to be viewed in sequence. The halftone pattern needs to change from one frame to the next. This causes the visibility of artifacts in the halftone pattern to be reduced when the sequence of frames is displayed.

Furthermore, the process of halftoning according to the present invention does not require the same halftoning technique to be used each time an image is halftoned. Alternatively, the halftoning techniques can be varied each time the image is halftoned. For example, dithering, stochastic screening, and error diffusion techniques can be used on the same image, simply by varying the particular technique used over time.

If the amount of time required to halftone a frame is less than the period between frames, the halftoning process can be performed in real time, regardless of whether the image to be displayed is static or animated. If the amount of time required to halftone a frame is more than the period between frames, an entire sequence of halftoned animated images may have to be pre-computed, stored, and subsequently replayed. For a static image, a sequence of halftoned frames can be stored and replaced in a continuous loop. Since the present invention can be implemented in hardware, software, or a combination of the two, the speed of the halftoning process can be optimized by implementing the invention in a design that is appropriate for a particular system.

And finally, the present invention is not limited to use for images displayed on a computer monitor. Those skilled in the art will appreciate that the present invention can be used in other types of output devices, such as televisions and movie players. The present invention can also be used with computer applications, such as games, movies, and displaying and transmitting images over communication channels, such as the Internet.

What is claimed is:

1. A method for halftoning an input image comprised of a plurality of pixels, the method comprising the steps of:

determining one of at least two halftone techniques in real time prior to halftoning the input image;

halftoning the input image by applying the one of at least two halftone techniques to the plurality of pixels in the input image, wherein each halftone technique has at least one halftone parameter that differs from the halftone parameters in the other halftone techniques; and repeating the step of halftoning the input image by applying one of the at least two halftone techniques to the plurality of pixels in the input image, wherein the one of at least two halftone techniques changes from the previously used halftone technique every time the input image is halftoned.

2. The method of claim 1, further comprising the step of successively outputting the halftoned input images.

3. The method of claim 1, wherein the step of halftoning the input image by applying one of at least two halftone techniques comprises the step of halftoning the input image by applying at least one transformed halftone technique to the plurality of pixels in the input image.

4. The method of claim 1, wherein the at least two halftone techniques are comprised of the same halftone method having at least one differing halftone parameter.

5. The method of claim 1, wherein the at least two halftone techniques are comprised of different halftone methods.

6. The method of claim 2, wherein the halftoned input images are successively output so that each halftoned input image comprises a frame of an output image.

7. The method of claim 1, further comprising the step of determining a starting location within the input image for initiating a halftone technique.

8. The method of claim 7, further comprising the step of offsetting the starting location from the previously used starting location after a certain number of input images have been halftoned.

9. The method of claim 8, wherein the starting location within the input image is offset from the previously used starting location every time the input image is halftoned.

10. The method of claim 1, wherein the step of halftoning the input image by applying one of at least two halftone techniques comprises the step of halftoning the input image by tiling the one of at least two halftone techniques over the plurality of pixels in the input image.

11. The method of claim 1, wherein the at least two halftone techniques are comprised of spatial halftone techniques.

12. An apparatus for halftoning an input image comprised of a plurality of pixels, the apparatus comprising:

means for determining one of at least two halftone techniques in real time prior to halftoning the input image;

means for halftoning the input image by applying the one of at least two halftone techniques to the plurality of pixels in the input image, wherein each halftone technique has at least one halftone parameter that differs from the halftone parameters in the other halftone techniques; and means for repeatedly halftoning the input image by applying one of the at least two halftone techniques to the plurality of pixels in the input image, wherein the one of at least two halftone techniques changes from the previously used halftone technique every time the input image is halftoned.

13. The apparatus of claim 12, further comprising means for successively outputting the halftoned input images.

14. The apparatus of claim 12, wherein the means for halftoning the input image by applying one of at least two halftone techniques comprises means for halftoning the input image by applying at least one transformed halftone technique to the plurality of pixels in the input image.

15. The apparatus of claim 12, wherein the at least two halftone techniques are comprised of the same halftone method having at least one differing halftone parameter.

16. The apparatus of claim 12, wherein the at least two halftone techniques are comprised of different halftone methods.

17. The apparatus of claim 13, wherein the halftoned input images are successively output so that each halftoned input image comprises a frame of an output image.

18. The apparatus of claim 12, further comprising means for determining a starting location within the input image for initiating a halftone technique.

19. The apparatus of claim 18, further comprising means for offsetting the starting location from the previously used starting location after a certain number of input images have been halftoned.

20. The apparatus of claim 19, wherein the starting location within the input image is offset from the previously used starting location every time the input image is halftoned.

21. The apparatus of claim 12, wherein the means for halftoning the input image by applying one of at least two halftone techniques comprises means for halftoning the input image by tiling the one of at least two halftone techniques over the plurality of pixels in the input image.

22. The apparatus of claim 12, wherein the at least two halftone techniques are comprised of spatial halftone techniques.

23. A computer-readable medium comprising program instructions for halftoning an input image comprised of a plurality of pixels by performing the steps of:

determining one of at least two halftone techniques in real time prior to halftoning the input image;

halftoning the input image by applying the one of at least two halftone techniques to the plurality of pixels in the input image, wherein each halftone technique has at least one halftone parameter that differs from the halftone parameters in the other halftone techniques; and repeating the step of halftoning the input image by applying one of the at least two halftone techniques to the plurality of pixels in the input image, wherein the one of at least two halftone techniques changes from the previously used halftone technique every time the input image is halftoned.

24. The computer-readable medium of claim 23, further comprising program instructions for performing the step of successively outputting the halftoned input images.

25. The computer-readable medium of claim 23, wherein the step of halftoning the input image by applying one of at least two halftone techniques comprises the step of halftoning the input image by applying at least one transformed halftone technique to the plurality of pixels in the input image.

26. The computer-readable medium of claim 23, wherein the at least two halftone techniques are comprised of the same halftone method having at least one differing halftone parameter.

27. The computer-readable medium of claim 23, wherein the at least two halftone techniques are comprised of different halftone methods.

28. The computer-readable medium of claim 24, wherein the halftoned input images are successively output so that each halftoned input image comprises a frame of an output image.

29. The computer-readable medium of claim 23, further comprising program instructions for performing the step of determining a starting location within the input image for initiating a halftone technique.

30. The computer-readable medium of claim 29, further comprising program instructions for performing the step of offsetting the starting location from the previously used starting location after a certain number of input images have been halftoned.

31. The computer-readable medium of claim 30, wherein the starting location within the input image is offset from the previously used starting location every time the input image is halftoned.

32. The computer-readable medium of claim 23, wherein the step of halftoning the input image by applying one of at least two halftone techniques comprises the step of halftoning the input image by tilting the one of at least two halftone techniques over the plurality of pixels in the input image.

33. The computer-readable medium of claim 23, wherein the at least two halftone techniques are comprised of spatial halftone techniques.

* * * * *